Aug. 11, 1964   D. R. SWAN   3,144,291
ELECTRICAL CONTACT-MAKING APPARATUS
Filed Oct. 24, 1960   2 Sheets-Sheet 1

*INVENTOR.*
DEAN R. SWAN
BY

ATTORNEYS

Aug. 11, 1964  D. R. SWAN  3,144,291
ELECTRICAL CONTACT-MAKING APPARATUS
Filed Oct. 24, 1960  2 Sheets-Sheet 2

INVENTOR.
DEAN R. SWAN
BY
Porter, Chittick, Russell & Pfund
ATTORNEYS

United States Patent Office 3,144,291
Patented Aug. 11, 1964

3,144,291
ELECTRICAL CONTACT-MAKING APPARATUS
Dean R. Swan, 65 Lovejoy Road, Andover, Mass.
Filed Oct. 24, 1960, Ser. No. 64,519
4 Claims. (Cl. 339—108)

This invention relates generally to electrical test equipment for electronic circuit components and particularly to electrical contact-making apparatus used in such test equipment and especially adapted to accommodate components having two opposed lead wires, as certain types of semiconductor diodes, resistors and capacitors.

It is customary in the manufacture of electronics circuit components of the type here considered to test the finished components to determine whether or not the characteristics of the components fall within certain specified limits. It is evident, therefore, that any satisfactory test equipment for use in the mass production of electronic circuit components should include electrical contact-making apparatus which is easy for relatively unskilled persons to use, dependable and consistent in operation, and obviates any chance of damage to the lead wires.

The requirements for electrical contact-making apparatus are particularly high when semiconductors diodes are to be tested because of the electrical characteristics of such devices. Particularly critical tests for such diodes are the determination of the ratio of forward to back resistance and the measurement of the absolute value of the forward resistance. In view of the relatively low value of forward resistance in the ordinary diode, it is apparent that extreme care must be taken to minimize the effect of contact resistance between the diode under test and the electrical contact-making apparatus.

In the prior art, well known "alligator" clips or binding posts have been used to make electrical contact between the component being tested and the test equipment. While either type of connector may be used, difficulty is often experienced. Thus, the "alligator" clip often makes poor electrical contact with either or both of the diode lead wires so that improper testing results, or if proper contact is obtained then excessive forces are exerted so as to deform the diode lead wires. On the other hand, if binding posts are used in testing production quantities the connection of the diode lead wires must of necessity be time-consuming to such a degree that testing of each and every diode produced adds a disproportionate amount to production costs. Also, with known types of connectors it is necessary sequentially to connect the leads of the element to be tested; such a requirement obviously slows down the testing operation and increases the chance of error arising out of poor connections.

Some attempts have been made to avoid the difficulties attendant on the use of connectors of the type thus mentioned. Thus, hydraulically or pneumatically operated contact-making devices have been devised. Such contact-making devices, however, are relatively complicated, expensive and difficult to main in proper working order. Therefore, even though such devices may offer a partial solution to the problem, there is still a great need in the art of a more practical connector for use in the testing of large lots of electronic circuit components.

Accordingly, it is one object of my invention to provide electrical test equipment having electrical contact-making apparatus associated therewith in which electrical contact with at least two separate lead wires of an electronic circuit element may be made simultaneously.

Another object of my invention is to provide electrical contact-making apparatus in which contact pressure on electrical components under test first may be adjusted as desired and thereafter will remain constant regardless of variations, within large limits, of the shape of the electrical components tested.

Still another object of my invention is to provide apparatus which quickly and easily receives the component to be tested and from which the component may be easily removed at the completion of the test.

A still further object of my invention is to provide electrical test equipment incorporating electrical contact-making apparatus which attains all the objects heretofore set forth without in any way damaging the component being tested.

These and other objects of my invention generally are attained by providing at least two fixed electrically conductive rods, each having an upwardly facing cut or notch formed therein to accommodate a lead wire to the element to be tested, separately spring-loaded sleeves slidably mounted on each of the rods so that one end of each sleeve exerts a predetermined force on the lead wires so as to press each of the lead wires against a side of its respective cut and means for retracting the spring-loaded sleeves simultaneously when it is desired to insert or remove an element. In addition, the rods are each provided with connecting means spaced from the cut so as to permit connection of the rods in circuit with the test equipment.

These and other objects and the features of my invention will appear as the description proceeds with the aid of the accompanying drawings in which.

Figure 1:
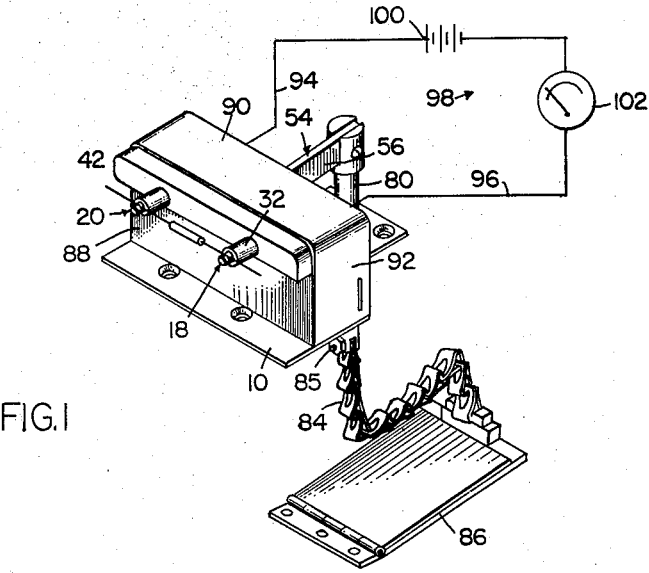
FIG. 1 is a view in perspective of the electrical contact-making apparatus showing foot operated means for actuating the apparatus.
Figure 2:
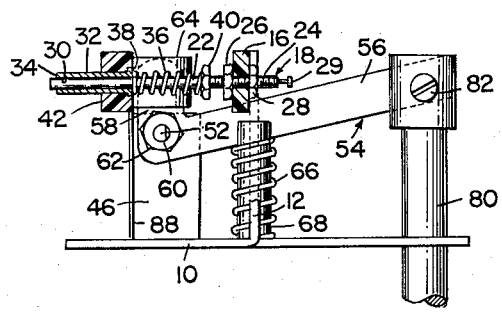
FIG. 2 is a cross-section in side elevation of the apparatus with the cover removed.
Figure 3:
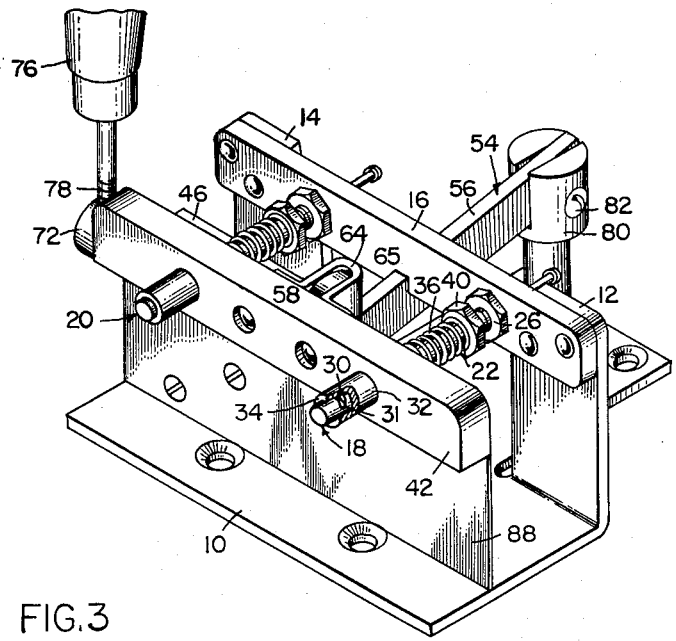
FIG. 3 is a partially cut-away view in perspective taken from the front with the cover of the apparatus removed and showing a handle in place for hand operation of the apparatus.
Figure 4:
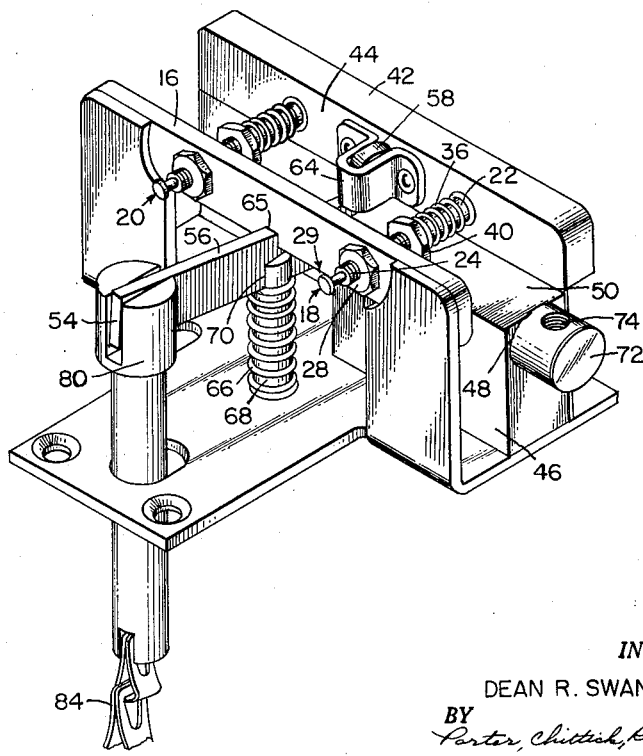
FIG. 4 is a view in perspective of the apparatus taken from the rear with the cover removed.

Having reference to the accompanying drawings for a more particular description, I employ a base 10 which is formed from a substantially square sheet of metal. Two upstanding support elements 12, 14 are provided by cutting and bending the base 10 to form two sections vertically disposed to the base 10 thereby forming a base element having the general configuration of a T.

To provide an electrically insulated support for mounting the spring loaded connectors hereinafter to be described, a flat transverse support bar 16 of insulating material, in the preferred embodiment a laminated plastic, is attached between the upper ends of the upstanding support elements 12, 14.

Two spring loaded connectors 18, 20 are mounted through the transverse insulating bar 16. The two connectors 18, 20 are identical and therefore only the connector 18 will be described.

The connector 18 comprises a cylindrical shank member, or rod 22 of a material which conducts electricity. In order to mount the rod 22 through the transverse support bar 16, the rearward portion of the rod 22 is provided with threads 24. A suitable opening through the transverse support bar 16 is provided, and the rearward portion of the rod 22 is positioned through the opening. Two nuts 26, 28 cooperating with the threads 24 are positioned one on either side of the transverse support bar 16, and are tightened against it. This causes the rod 22 to extend perpendicularly to the transverse support bar 16, and substantially parallel to the base 10. The rearmost portion of the rod 22 is formed into a pin 29 by means of which the connector may be wired into the test circuit.

To provide the rod 22 with means to receive a component's lead wire, a substantially rectangular cut 30 having right angled interior corners 31 is made in the forward portion of the rod 22. The cut 30 is made at an angle to the longitudinal axis of the rod 22, having its bottom further forward than its top. The cut 30 is further positioned so that a lead wire may be received in it from above. It is noted that the width of the cut 30 is greater than the greatest diameter of lead wire to be inserted therein in operation.

To complete the connector 18 a hollow cylindrical sleeve 32 is slidably mounted on the rod 22. The front end 34 of the sleeve 32 defines a plane perpendicular to the longitudinal axis of the rod 22. In operation, a lead wire is inserted in the cut 30 and held in place by the pressure exerted by the end 34 of the sleeve 32 which is caused to close against it.

The closing pressure is provided by a coil spring 36 which surrounds the rod 22. The forward end of the spring 36 abuts a circumferential flange 38 formed at the rearward end of the sleeve 32. The other end of the spring 36 rests against a nut 40 positioned on the threaded portion 24 of the rod 22. Adjustment of the tension in the spring 36 to adjust the pressure and ensure simultaneous operation of the connectors 18, 20 is thus easily accomplished by rotating the nut 40.

In order to provide means for opening the connectors 18, 20 a second transverse insulating bar 42 is provided. The bar 42 is substantially similar to the bar 16 and is provided with two openings through which the cylindrical sleeves 32 of the connectors 18, 20 are inserted. The sleeves 32 are prevented from passing entirely through the openings in the bar 42 by means of the circumferential flanges 38 which fit up against the rear face 44 of the bar 42.

Movement of the front insulating bar 42 toward the rear insulating bar 16 is necessary to cause the connectors 18, 20 to open to receive the leads of the element to be tested. This is accomplished by a lever arm system hereinafter to be described.

It is noted here that the connectors 18, 20 are preferably marked to indicate polarity so that the apparatus may easily be incorporated in electrical test equipment.

A substantially rectangular block 46 is mounted on the base 10 extending slightly less than half-way across the base 10, parallel to the insulating bars 16, and 42, and slightly rearward of the movable bar 42. A cylindrical passage 48 transverse to the base 10 is provided through the block 46 near its top face 50. The passage 48 is therefore also parallel to the insulating bars 16, and 42. A pivot rod 52 is rotatably positioned in the passage 50 and provides a pivot member. In order to move the front insulating bar 42 a lever arm 54 is provided. The lever arm 54 is formed with a longer segment 56 and a shorter segment 58 at right angles to the longer segment 56. An opening 60 is provided through the lever arm 54 at the intersection of the longer and shorter segments thereof.

The lever arm 54 is secured for pivoting by fitting the pivot rod 52 through the opening 60 formed in the lever arm 54. A locking nut 62 is used to engage the pivot rod 52 and the lever arm 54 so that the lever arm may not be accidentally disengaged.

A U-shaped bracket 64 is affixed to the rear face 44 of the front bar 42, substantially at its mid-point, and the shorter segment 58 of the lever arm 54 is engaged within it. The longer segment 56 is thus positioned extending generally rearward from the block 46. The block 46 is constructed so that its top face 50 does not interfere with the movement of the front insulating bar 42. Downward movement of the longer segment 56 of the lever arm 54 thus causes rearward movement of the front bar 42 and consequently the opening of the connectors 18, 20. A slot 65 must be cut in the undersurface of the fixed insulating bar 16 to accommodate the longer segment 56 of the lever arm 54 when it is in raised position.

To keep the longer segment 56 in normally raised position and to keep the connectors 18, 20 closed, it is desirable to assist the springs 36 which tend to close the connectors 18, 20. This is accomplished by means of a coil spring 66 which surrounds an upstanding cylinder 68 attached to the base 10 and positioned under the lever arm 54 slightly rearward of the upstanding support elements 12, 14. A slot 70 is provided in the upstanding cylinder 68 so that the lever arm 54 may descend to open the connectors 18, 20 when sufficient force is exerted to compress the spring 66 and the springs 36.

Two different means are provided for operating the lever arm 54. One means comprises a cylindrical receiving member 72 formed at the outer end of the cylindrical pivot rod 52. A threaded cavity 74 is transversely positioned in the receiving member 72. A handle 76 having a threaded shank 78 may thereby be screwed into the receiving member 72. Rotation of the handle 76 in the proper direction will thus open the connectors 18, 20.

The alternative means for opening the clips 18, 20 comprises a cylindrical member 80 which is attached by a bolt 82 to the rearmost end of the lever arm 54 in such fashion that it will hang downward therefrom and may be swung slightly in relation thereto to remain substantially vertical regardless of the angle of the lever arm 54. A chain 84 is attached to the lower end of the cylindrical member 80 by a bolt 85. The other end of the chain 84 is attached to a foot pedal 86 which may be mounted on the floor below the test stand.

Two decorative and protective members are added to complete the contemplated electrical contact-making apparatus. A front face plate 88 is mounted on the front of the block 46. The plate 88 is rectangular in shape, being the width of the base 10 and extending upwardly to a point just below the bottom of the movable insulating support bar 42. A cover 90 is also provided with downwardly extending sides 92 dimensioned to engage the upstanding support elements 12, 14 to provide sides and a top for the apparatus.

Electrical leads 94, 96 are attached, as by soldering, to the pins 29 to connect the electrical contact-making apparatus to test equipment 98. In its simplest form, the test equipment 98 may be a power source 100 and a D'Arsonval instrument 102 in series, with the instrument 102 being calibrated directly to indicate resistance of the electronic circuit element under test. When testing elements, as semiconductor diodes, where the polarity of the power source affects the results of the test, it is an easy matter to insert a reversing switch in the test equipment.

The operation of the device is as follows:

The apparatus is secured to the work bench and the foot pedal 86 is appropriately positioned. The connectors 18, 20 are wired into the testing circuit by means of connections made at the pins 29.

The operator then depresses the foot pedal 86 or moves the handle 76, either of which causes the connectors 18, 20 to open. If the connectors 18, 20 do not open simultaneously the proper nut 40 is rotated appropriately to change the tension in the associated spring 36. The lead wires of the test specimen are then simultaneously dropped into the cuts 30 in the rods 22 with one lead resting in each cut. The pressure on the foot pedal 86 is decreased or the handle 76 is released until the connectors 18, 20 firmly close on the leads. The reading is taken and the pedal 86 again depressed or the handle 76 moved to open the connectors 18, 20 in order that the test specimen may be removed. Further adjustment of the proper nut 40 will synchronize the opening and closing of connectors 18, 20 when elements having different lead wires are to be tested.

Several obvious modifications will become apparent to those having skill in the art. Among such modifications are changing the number of connectors so as to adapt the apparatus to electronic circuit elements having more than two lead wires, as transistors. Another modification is to serrate the cut 30 to localize pressure on the lead wire of the element being tested to ensure breaking of any thin oxide coating thereon and thus ensuring a low contact resistance between the connector and the lead wire of the element being tested.

It is my intention to cover all changes and modifications in the invention herein chosen for purposes of disclosure which do not constitute departures from the spirit and scope of the invention.

Having thus described and illustrated a preferred embodiment of my invention, what I claim as new and desire to secure by Letters Patent of the United States is:

1. Electrical contact-making apparatus comprising; a first insulated transverse supporting member; two spaced apart electrical connectors having electrically conductive shanks mounted in said first supporting member and extending normal thereto, each said shank having a notch therein for receiving the wire lead of an electrical component; sleeves carried on said shanks being axially slidable toward and away from said shank notches; a second insulated transverse supporting member mounted on and movable with said sleeves; actuating means engaging said second supporting member for moving said sleeves away from said notches to permit the insertion of electrical component wire leads therein; spring means engaging said shanks for biasing said sleeves toward said notches to clamp said wire leads therein; and means carried by said shanks for independently regulating the biasing force exerted by said spring means on said sleeves.

2. Apparatus of claim 1 wherein said independent regulating means includes a nut threadably engaging said shank, said nut abutting said spring means and being axially movable to adjust the spring means tension.

3. Apparatus of claim 1 wherein said actuating means includes a manually operable lever.

4. Apparatus of claim 1 wherein said actuating means includes a foot pedal.

References Cited in the file of this patent

UNITED STATES PATENTS

| | | |
|---|---|---|
| 1,594,456 | Conway | Aug. 3, 1926 |
| 2,701,871 | Rauch | Feb. 8, 1955 |
| 2,839,723 | De Armond | June 17, 1958 |
| 2,865,003 | Harmon | Dec. 16, 1958 |
| 2,866,948 | Witt | Dec. 30, 1958 |
| 2,981,919 | La Mont et al. | Apr. 25, 1961 |
| 3,022,483 | Youger | Feb. 20, 1962 |
| 3,072,876 | Balles | Jan. 8, 1963 |

FOREIGN PATENTS

| | | |
|---|---|---|
| 660,645 | Germany | May 30, 1938 |